(12) United States Patent
Das et al.

(10) Patent No.: US 8,291,481 B2
(45) Date of Patent: Oct. 16, 2012

(54) SESSIONLESS REDIRECTION IN TERMINAL SERVICES

(75) Inventors: Munindra N. Das, Redmond, WA (US); Sriram Sampath, Redmond, WA (US); Huei Chung Wong, Kirkland, WA (US); Rouslan Beletski, Kenmore, WA (US); Dave Dopson, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1026 days.

(21) Appl. No.: 12/163,945

(22) Filed: Jun. 27, 2008

(65) Prior Publication Data

US 2009/0328172 A1    Dec. 31, 2009

Related U.S. Application Data

(60) Provisional application No. 60/973,357, filed on Sep. 18, 2007.

(51) Int. Cl.
*G06F 7/04* (2006.01)
*G06F 15/16* (2006.01)
*G06F 17/30* (2006.01)
*G06F 9/00* (2006.01)
*G06F 17/00* (2006.01)
*G06F 15/173* (2006.01)
*H04L 29/06* (2006.01)

(52) U.S. Cl. ......... 726/7; 726/8; 726/9; 726/10; 726/11; 726/15; 709/225; 709/226

(58) Field of Classification Search ............... 726/7, 15
See application file for complete search history.

(56) References Cited

U.S. PATENT DOCUMENTS

| | | | | |
|---|---|---|---|---|
| 5,708,780 | A | * | 1/1998 | Levergood et al. ........... 709/229 |
| 5,740,361 | A | * | 4/1998 | Brown ................................ 726/5 |
| 5,915,095 | A | * | 6/1999 | Miskowiec .................... 709/223 |
| 6,085,247 | A | * | 7/2000 | Parsons et al. ................ 709/227 |
| 6,098,093 | A | * | 8/2000 | Bayeh et al. .................. 709/203 |
| 6,226,752 | B1 | * | 5/2001 | Gupta et al. ...................... 726/9 |
| 6,594,350 | B2 | | 7/2003 | Tang |
| 6,763,468 | B2 | * | 7/2004 | Gupta et al. ...................... 726/2 |
| 6,766,373 | B1 | | 7/2004 | Beadle et al. |
| 7,080,404 | B2 | * | 7/2006 | Abdo et al. ....................... 726/3 |
| 7,133,891 | B1 | | 11/2006 | Uceda-Sosa et al. |

(Continued)

OTHER PUBLICATIONS

New Authentication Functionality in Windows Vista, http://blogs.msdn.com/qindowsvistasecurity/archive/2006/08/25/724271, Aug. 25, 2006, 8 Pages.

(Continued)

*Primary Examiner* — Carolyn B Kosowski
(74) *Attorney, Agent, or Firm* — Workman Nydegger (57) ABSTRACT

Embodiments described herein are directed to establishing a terminal services (TS) session between a TS server and the client without creating a temporary session. In one embodiment, a computer system receives a user request indicating that a TS session with a first TS server is to be initiated. The request includes an indication that the user is authenticated and authorized to use the first TS server. The computer system searches for any prior TS sessions previously initiated by the user with other TS servers and determines, based on the search, that at least one prior TS session was initiated with a second TS server. The computer system also sends redirection data to the user indicating that the user request is to be redirected to the second TS server to reestablish the prior TS session with the second TS server.

13 Claims, 3 Drawing Sheets

U.S. PATENT DOCUMENTS

| | | | |
|---|---|---|---|
| 7,162,525 B2* | 1/2007 | Cofta et al. | 709/228 |
| 7,383,571 B2* | 6/2008 | Abdo et al. | 726/3 |
| 7,475,421 B2* | 1/2009 | Abdo et al. | 726/3 |
| 7,526,762 B1* | 4/2009 | Astala et al. | 717/171 |
| 7,913,084 B2* | 3/2011 | Medvinsky et al. | 713/168 |
| 8,015,331 B2* | 9/2011 | Sampath et al. | 710/62 |
| 8,090,847 B2* | 1/2012 | Dopson et al. | 709/228 |
| 8,132,247 B2* | 3/2012 | Adhya et al. | 726/11 |
| 2004/0187076 A1 | 9/2004 | Ki et al. | |
| 2005/0198379 A1 | 9/2005 | Panasyuk et al. | |
| 2006/0021004 A1 | 1/2006 | Moran et al. | |
| 2006/0117106 A1 | 6/2006 | Abdo et al. | |
| 2006/0195586 A1* | 8/2006 | Stoyanov et al. | 709/227 |
| 2007/0005693 A1* | 1/2007 | Sampath et al. | 709/204 |
| 2007/0094153 A1 | 4/2007 | Ferraro | |
| 2008/0034057 A1* | 2/2008 | Kumar et al. | 709/217 |
| 2008/0046994 A1* | 2/2008 | Venkatraman et al. | 726/15 |
| 2008/0091814 A1 | 4/2008 | Xie | |
| 2009/0006503 A1* | 1/2009 | Bernardi et al. | 707/205 |
| 2009/0006537 A1* | 1/2009 | Palekar et al. | 709/203 |
| 2009/0037763 A1* | 2/2009 | Adhya et al. | 714/4 |
| 2009/0037998 A1* | 2/2009 | Adhya et al. | 726/11 |
| 2009/0044170 A1* | 2/2009 | Bernardi et al. | 717/105 |
| 2009/0113058 A1* | 4/2009 | Ou et al. | 709/227 |
| 2009/0241176 A1* | 9/2009 | Beletski et al. | 726/7 |
| 2009/0327498 A1* | 12/2009 | Sampath et al. | 709/228 |
| 2009/0328172 A1* | 12/2009 | Das et al. | 726/7 |
| 2010/0146611 A1* | 6/2010 | Kuzin et al. | 726/8 |
| 2012/0023558 A1* | 1/2012 | Rafiq | 726/6 |
| 2012/0054742 A1* | 3/2012 | Eremenko et al. | 718/1 |

OTHER PUBLICATIONS

Instantaneous Session Broker Redirection Leveraging CredSSP, http://www.brianmadden.com/new/1920, 2008, 4 Pages.

Windows Authentication, http://207.46.196.114/windowsserver2008/en/library/f3cd26b1-a948-46b7-a8ee-f2fde84f93f81033.mspx?mfr=true, Feb. 7, 2008, 3 Pages.

* cited by examiner

SESSIONLESS REDIRECTION IN TERMINAL SERVICES

CROSS-REFERENCE TO RELATED APPLICATIONS

This application claims the benefit of U.S. Provisional Application No. 60/973,357, entitled "Client Connection Management in Terminal Services," filed on Sep. 18, 2007, which is incorporated herein in its entirety.

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In many cases, software applications are designed to interact with other software applications or other computer systems such as computer servers. For example, in some computing environments, it is desirable to implement terminal services. In such cases, a server (or group of servers) typically provides software applications, data and other services to a large number of user terminals. Terminal machines typically have very limited resources and rely on the terminal server(s) to supply those services. Such connections between terminal machines and terminal servers may be referred to as terminal services sessions.

In many cases, initiating a terminal services session includes a series of steps. Typically, in a scenario involving multiple terminal servers, a user indicates that they want to connect to a terminal server. One of the terminal servers receives the indication and prompts the user to input authentication credentials so that the server can search for other existing (disconnected) terminal services sessions previously created by the user. Using the authentication credentials, the terminal server creates a temporary session to search for existing sessions. Upon finding an existing session, the server sends a message to the user indicating that a disconnected session exists on another terminal server. The message typically includes a redirection indication identifying the terminal server to which the user is to connect. The user then initiates contact with the other terminal server, upon which the user is again prompted to input authentication credentials in order to login to the server.

BRIEF SUMMARY

Embodiments described herein are directed to establishing a terminal services (TS) session between a TS server and the client without creating a temporary session. In one embodiment, a computer system receives a user request indicating that a TS session with a first TS server is to be initiated. The request includes an indication that the user is authenticated and authorized to use the first TS server. The computer system searches for any prior TS sessions previously initiated by the user with other TS servers and determines, based on the search, that at least one prior TS session was initiated with a second TS server. The computer system also sends redirection data to the user indicating that the user request is to be redirected to the second TS server to reestablish the prior TS session with the second TS server.

In another embodiment, a computer system establishes a TS session between a TS server of a server farm and a client without creating a temporary session. The computer system receives user authentication credentials as part of a TS server login request, where the authentication credentials are generated by a credential service on the user's computer system. A user request is received at a TS server farm session broker where the request indicates that a TS session with a TS server in the server farm is to be initiated, and where the request includes identification information identifying the user as the user whose authentication credentials were previously received. The computer system searches for any prior TS sessions previously initiated by the user with other TS servers in the server farm using the received authentication credentials, and, based on the search, determines that at least one prior TS session was initiated with an identified TS server in the server farm. The computer system also sends redirection data to the user indicating that the user request is to be redirected to the identified TS server to reestablish the prior TS session with the identified TS server in the server farm.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Embodiments described herein are directed to establishing a terminal services (TS) session between a TS server and the client without creating a temporary session. In one embodiment, a computer system receives a user request indicating that a TS session with a first TS server is to be initiated. The request includes an indication that the user is authenticated and authorized to use the first TS server. The computer system searches for any prior TS sessions previously initiated by the user with other TS servers and determines, based on the search, that at least one prior TS session was initiated with a second TS server. The computer system also sends redirection data to the user indicating that the user request is to be redirected to the second TS server to reestablish the prior TS session with the second TS server.

In another embodiment, a computer system establishes a TS session between a TS server of a server farm and a client without creating a temporary session. The computer system receives user authentication credentials as part of a TS server login request, where the authentication credentials are generated by a credential service on the user's computer system. A user request is received at a TS server farm session broker where the request indicates that a TS session with a TS server in the server farm is to be initiated, and where the request includes identification information identifying the user as the user whose authentication credentials were previously received. The computer system searches for any prior TS sessions previously initiated by the user with other TS servers in the server farm using the received authentication credentials, and, based on the search, determines that at least one prior TS session was initiated with an identified TS server in the server farm. The computer system also sends redirection data to the user indicating that the user request is to be redirected to the identified TS server to reestablish the prior TS session with the identified TS server in the server farm.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media including recordable-type storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry or transport desired program code means in the form of computer-executable instructions or data structures and which can be accessed by a general purpose or special purpose computer. Combinations of the above should also be included within the scope of computer-readable media.

However, it should be understood, that upon reaching various computer system components, program code means in the form of computer-executable instructions or data structures can be transferred automatically from transmission media to physical storage media. For example, computer-executable instructions or data structures received over a network or data link can be buffered in RAM within a network interface card, and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 1:
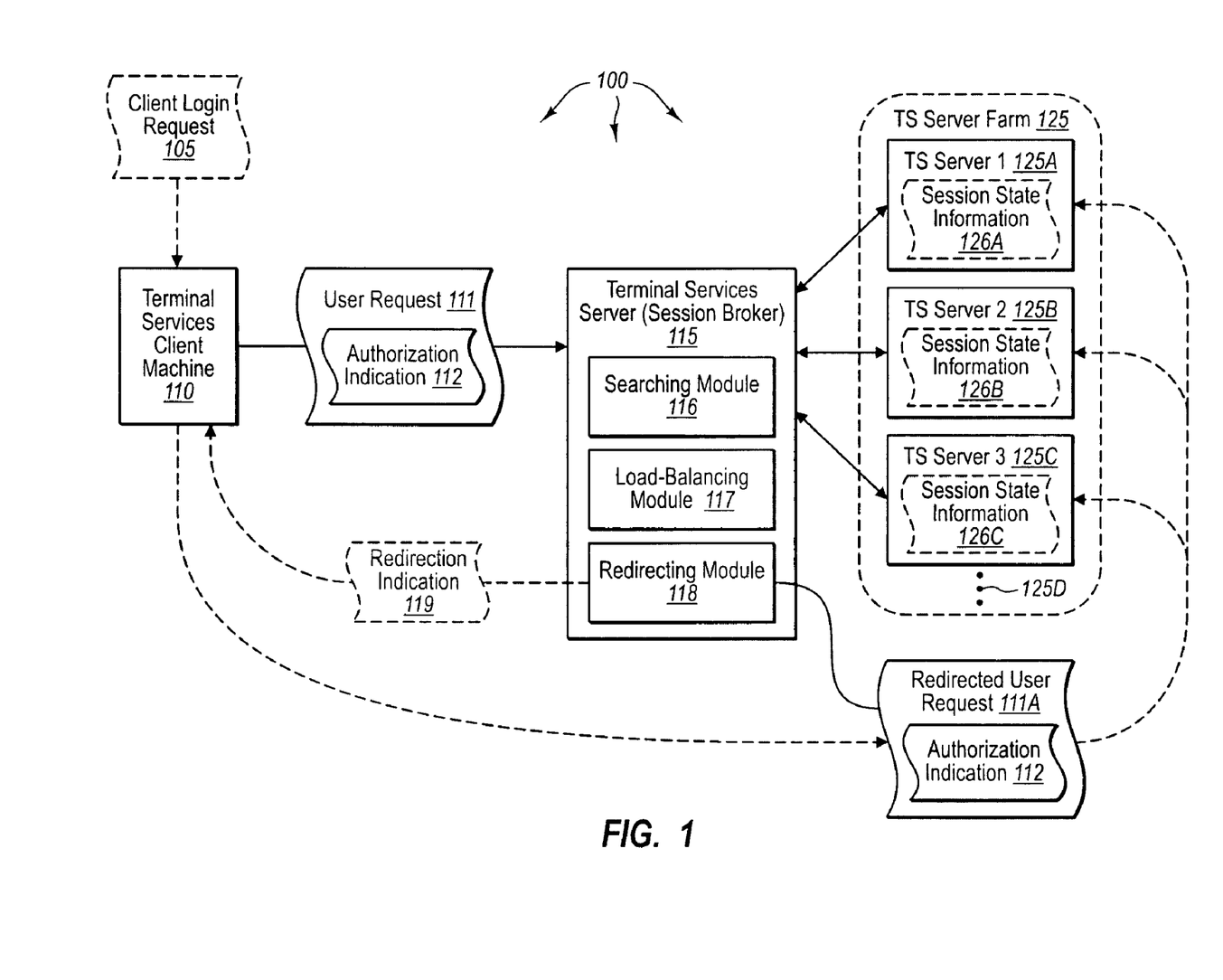
FIG. 1 illustrates a computer architecture in which embodiments of the present invention may operate including establishing a terminal services (TS) session between a TS server and the client without creating a temporary session.

FIG. 1 illustrates a computer architecture 100 in which the principles of the present invention may be employed. Computer architecture 100 includes terminal services server 115. Terminal services (TS) may be used in a variety of situations to centralize software application distribution and reduce client machine costs. For example, because client terminals (e.g. terminal services client machine 110) receive application data from a TS server, they may be lean on hardware, which reduces costs. In such situations, the TS server typically receives and processes client inputs, along with providing any software applications and other resources requested by the client. Thus, the client relies heavily on the TS server to perform the bulk of the processing, storage, and other functions.

In some cases, such as in large corporations, schools or government offices, multiple TS servers will be used to handle the load generated by a large number of clients. In such situations, TS server farms (e.g. TS server farm 125) may be set up to distribute the load over multiple TS servers (e.g. TS server 1 (125A), TS server 2 (125B), TS server 3 (125C), and others (125D)). One server may be used to control the load between the servers of a server farm. As used herein, such a server is referred to as a TS session broker. Within session broker 115, load-balancing module 115 may be used to distribute client request to TS servers, such that the load is balanced among them. Clients may login to session broker 115 and may be redirected to other servers in the TS server farm based on a current load determination.

For example, TS client machine 110 may send user request 111 to TS server 115. User request 111 includes authorization indication 112 indicating that the user is authorized to use and access TS server 115. In some cases, authorization indication 112 is provided by an authentication credential service. Such a service uses client authentication credentials (perhaps received in client login request 105) to authenticate the client before sending the user request to the server. One such authentication credential service may include Credential Security Service Provider (CredSSP). CredSSP may be configured to receive user authentication credentials and delegate the user's credentials from the client terminal to the target server. This will be explained in greater detail below.

Upon receiving user request 111, searching module 116 of TS server 115 may be used to search for any prior sessions created with another server of server farm 125. For example, the user may have been connected to TS server 1 and may have established a TS session with that server. Such session information may be stored on each TS server (e.g. session state information 126A, 126B and 126C). During a session, either or both of the client and the server may be interrupted, resulting in a disconnected session. Searching module 116 may be configured to detect and find such existing sessions. Upon finding a prior session, redirecting module 118 of TS server 115 may send redirection indication 119 to client 110 and send a redirected user request 111A, including authorization information 112, to the appropriate TS server as determined by the result of the search. In some cases, redirected user request 111A may be sent directly from TS server 115 or may be sent by client 110 after the client has received redirection indication 119. These and other concepts will be explained in greater detail below with regard to method 200 of FIG. 2 and method 300 of FIG. 3.

Figure 2:
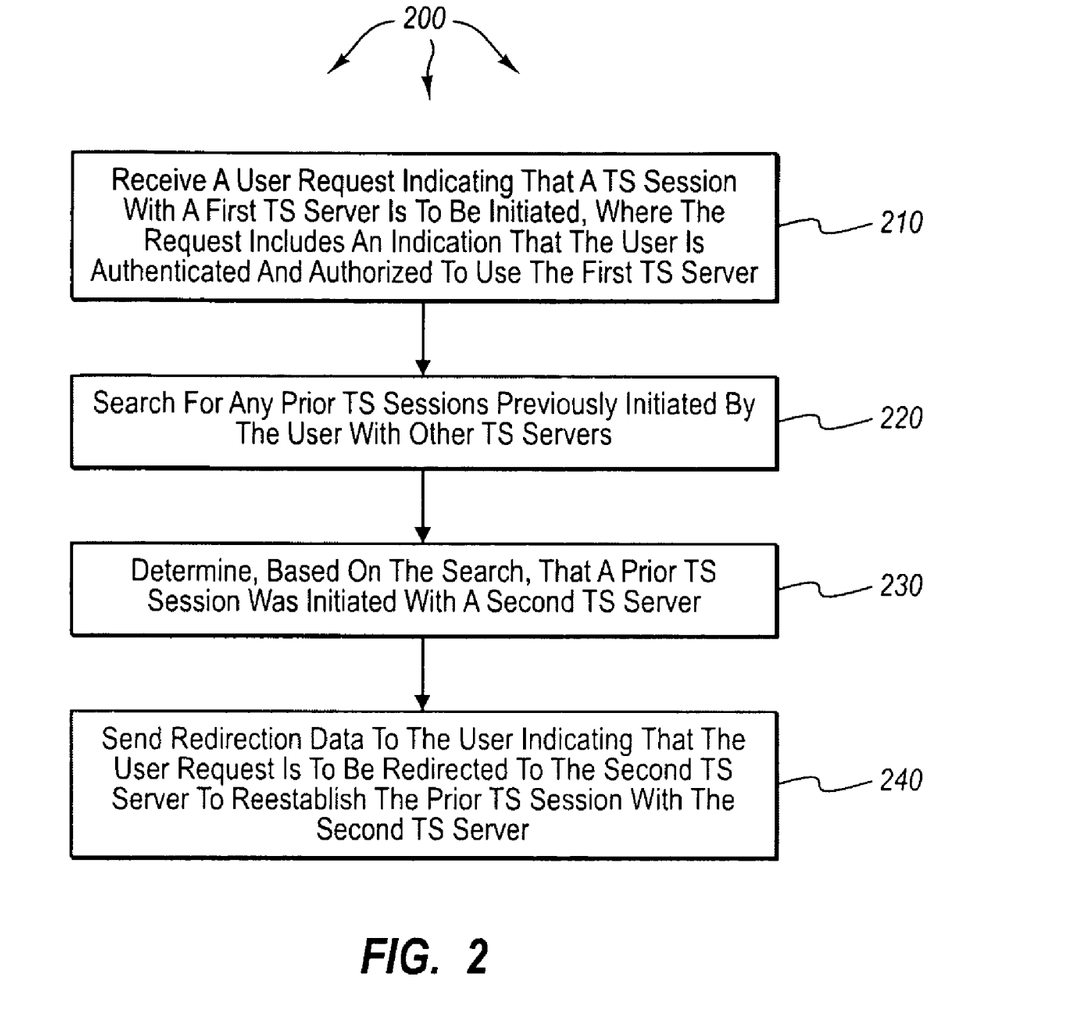
FIG. 2 illustrates a flowchart of an example method for establishing a TS session between a TS server and the client without creating a temporary session.

FIG. 2 illustrates a flowchart of a method 200 for establishing a terminal services (TS) session between a TS server and the client without creating a temporary session. The method 200 will now be described with frequent reference to the components and data of environment 100.

Method 200 includes an act of receiving a user request indicating that a TS session with a first TS server is to be initiated, the request including an indication that the user is authenticated and authorized to use the first TS server (act 210). For example, TS server 115 may receive user request 111 indicating that a TS session with TS server 115 is to be initiated. It should be noted that, in some cases TS server 115 may be a standalone server, or may act as a TS server in addition to being a session broker. The request received by TS server 115 may include authorization indication 112 indicating that the user is authenticated and authorized to use TS server 115. In some embodiments, the indication that the user is authenticated and authorized to use the first TS server includes identification information identifying the user's identity. Thus, in cases where an authentication service has been used to authenticate a user to server 115, identification information identifying the user and/or the user's computer system may be sent to server 115 to inform the server that the request is being sent from the user/terminal that has already been authenticated.

In some embodiments, client authentication to server 115 may occur before the client has requested a terminal services session. For instance, server 115 may receive authentication credentials, or a delegation of credentials from client machine 110. These credentials may be generated by a credential service such as CredSSP. In some cases, the credentials may be generated based on information received as part of a login request (e.g. login request 105). For example, a credential service may use a login and password received when the client initially logged in to client machine 110 to generate the authentication credentials sent to TS server 115, either with user request 111 or prior to sending user request 111. These service-generated credentials may be used to authenticate the user to the first TS server prior to receiving the user request 111 from the user.

In some cases, these credentials may be passed by server 115 to other servers of server farm 125 and may be used by a session broker to search for any existing, prior sessions between a TS server and the client. Thus, for example, TS server 2 (125B) may receive the authentication credentials and establish a TS session using the received credentials. In such cases, TS server 115 may receive a user request, search for any existing, disconnected sessions and redirect the client to the appropriate TS server automatically, and without creating a temporary TS session between client machine 110 and server 115.

Method 200 includes an act of searching for any prior TS sessions previously initiated by the user with other TS servers (act 220). For example, searching module 116 may search for any prior TS sessions previously initiated by the user with any of TS servers 125A-D. In some cases, the previously initiated TS as session is a disconnected session, where a connection between the client and TS server was lost during the session. It may be determined that, based on the search, no prior TS sessions were established with other TS servers by the user. In such cases, a TS session may be established with TS server 115 using the user authentication credentials received in the user request. In other cases, it may be determined that, based on the search, a prior TS session was established with the TS server 115 by the user. In such cases, the session may be reestablished with TS server 115 using the user authentication credentials received in the user request. Thus, regardless of where the prior session is found (i.e. on server 115, any of the servers in server farm 125, or in another server farm), the client may be automatically redirected to the appropriate server on which the prior session was initiated.

Method 200 includes an act of determining, based on the search, that at least one prior TS session was initiated with a second TS server (act 230). For example, TS server 115 may determine, based on the search, that a prior TS session was initiated with, for example, TS server 3 (125C). In such an embodiment, TS server 3 may include session state information 126C that includes session IDs, user names, server names and other appertaining session state information. TS server 3 (125C) may use this information in reestablishing the prior session with the client.

Method 200 includes an act of sending redirection data to the user indicating that the user request is to be redirected to the second TS server to reestablish the prior TS session with the second TS server (act 240). For example, TS server 115 may send redirection indication 119 to TS client machine 100 including redirection data indicating that the client is to be redirected to, for example, TS server 2 (125B) to reestablish the prior TS session with TS server 2. Upon being redirected to TS server 2, the client may be prompted to enter login credentials to establish a TS as session with server 2 (125B). In this manner, a TS server may be able to receive a user request to establish a session, perform a search for prior sessions associated with the user, and upon finding such a prior session, instantaneously redirecting the client to the appropriate TS server without establishing a temporary session to perform the search.

Figure 3:
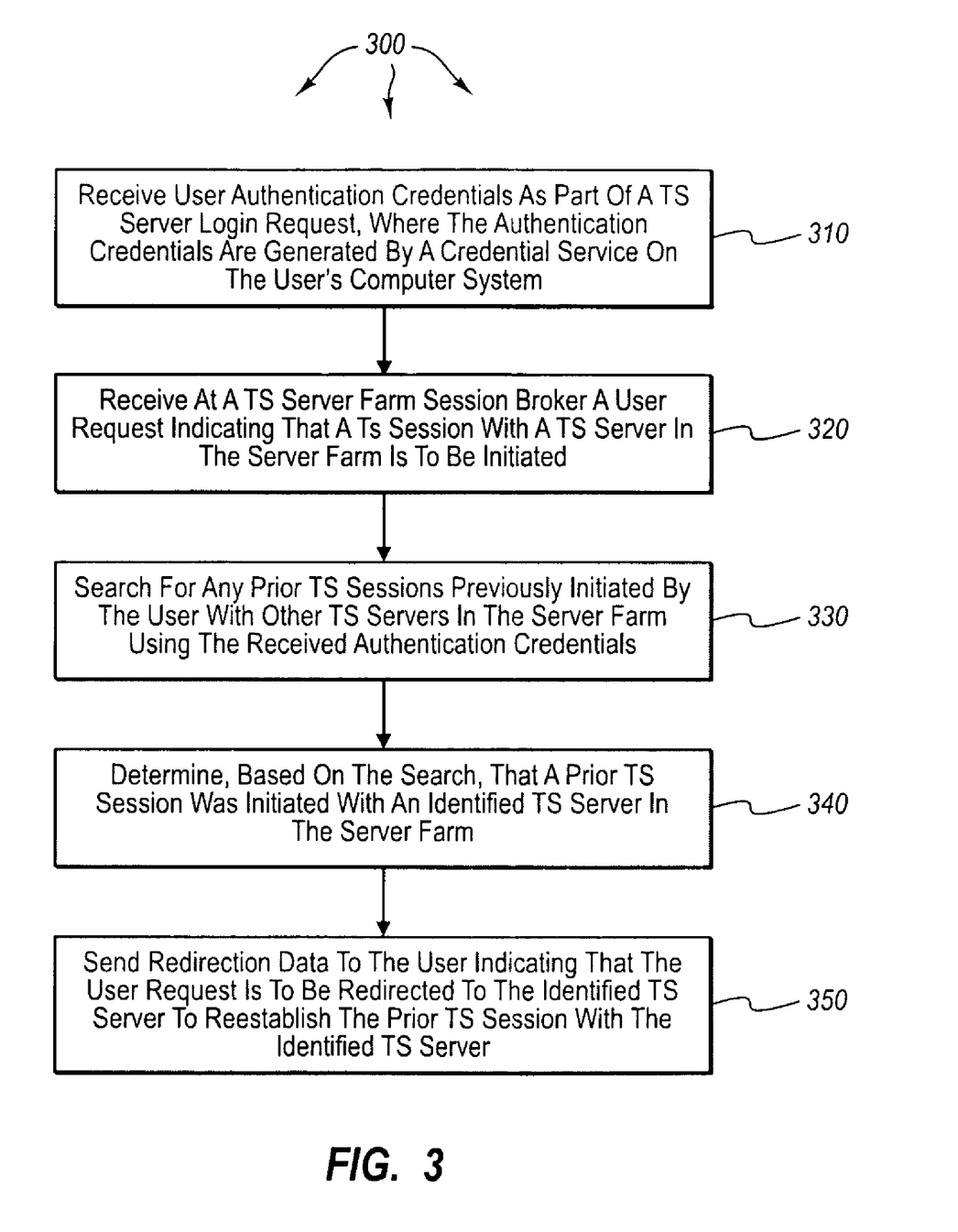
FIG. 3 illustrates a flowchart of an example method for establishes a TS session between a TS server of a server farm and a client without creating a temporary session.

FIG. 3 illustrates a flowchart of a method 300 for establishing a TS session between a TS server of a server farm and a client without creating a temporary session. The method 300 will now be described with frequent reference to the components and data of environment 100.

Method 300 includes an act of receiving at a TS server farm session broker user authentication credentials as part of a TS server login request, the authentication credentials having been generated by a credential service on the user's computer system (act 310). For example, TS server farm session broker 115 may receive user authentication credentials as part of a TS server login request. The authentication credentials may have been generated by a credential service on the user's computer system. In some embodiments, the credential service may be CredSSP. CredSSP may be configured to use the client's computer system login credentials to generate the client's TS authentication credentials. TS server farm session broker 115 may be configured to store session information including session IDs, user names, server names and other session state information. This information may be used when determining to which TS server in farm 125 a user request is to be forwarded.

Method 300 includes an act of receiving at the TS server farm session broker a user request indicating that a TS session with a TS server in the server farm is to be initiated, the request including identification information identifying the user as the user whose authentication credentials were previously received (act 320). For example, TS server farm session broker 115 may receive user request 111 indicating that a TS session with a TS server in server farm 125 is to be initiated. The request may include identification information identifying the user as the same user for whom authentication credentials were previously received. Accordingly, a credential service may generate and send authentication credentials that correspond to a given user to session broker 115. Thereafter, upon receiving identification information in a user request indicating that the user is the user for whom authentication credentials were received, the TS session broker may perform searches for disconnected sessions, as well as performing other actions specified by the user.

Method 300 includes an act of the TS server farm session broker searching for any prior TS sessions previously initiated by the user with other TS servers in the server farm using the received authentication credentials (act 330). For example, searching module 116 may search for any prior TS sessions previously initiated by client machine 110 with any or all of TS servers 125A-D in server farm 125 using the received authentication credentials. In some cases, TS server 115 may determine that multiple different prior TS sessions were initiated with different TS servers in server farm 125. In such cases, TS server farm session broker 115 may determine, based on current server load status, which of the determined plurality of TS servers is best suited to handle the request.

For example, load-balancing module 117 may query the TS servers in the server farm to determine each server's current processing load. Generally, the TS server with the lowest processing load, or the server with the greatest ability to handle the user request is selected. In this manner, the processing load may be balanced over each of the servers in the farm. It should be understood that the load-balancing may be dynamic and automatic, and may involve moving shifting sessions among servers. Upon determining which TS server is best suited to handle a user request (i.e. reestablish a session), redirecting module 118 may redirect the user request (e.g. redirected user request 111A) to the TS server determined to be the best suited to handle the request. In cases where multiple prior sessions were detected and one was reestablished, other prior sessions may be discarded.

Method 300 includes an act of the TS server farm session broker determining, based on the search, that at least one prior TS session was initiated with an identified TS server in the server farm (act 340). For example, session broker 115 may determine, based on the search, that at least one prior TS session was initiated with, for example, TS server 1 (125A) in server farm 125.

Method 300 also includes an act of sending redirection data to the user indicating that the user request is to be redirected to the identified TS server to reestablish the prior TS session with the identified TS server in the server farm (act 350). For instance, continuing the above example, redirecting module 118 may send redirection data (e.g. 119) to client machine 10 indicating that user request 111 is to be redirected to TS server 2 (125A). Thus, TS client machine 110 or redirecting module 118 may send redirected user request 111A, including authorization information 112, to TS server 2 so that the prior session can be reestablished. TS server 2 (125A) may receive redirected user request 111A and establishing a TS session using the authorization information included in the user request, such that the TS session between the client and the indicated TS server is established without creating a temporary session between the client and TS server farm session broker 115. In some cases, settings, policies, user preferences and the like may be initiated in the reestablished session, as indicated in stored session state information 126A.

Accordingly, a terminal services session broker may receive a user request indicating that a disconnected session is to be restored. The TS session broker may search for disconnected sessions on a server farm using authenticating credentials provided by a credential service without creating a temporary session between the client and the session broker. Upon detecting a prior session, the client may be instantaneously redirected to the TS server in the server farm on which the prior session was established.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computer networking environment comprising a plurality of computing systems including a client computer system and a terminal server computer system, a computer-implemented method for establishing a terminal services (TS) session between a TS server and a user at the client computing system without creating a temporary session, the computer-implemented method being performed by acts that are executed in the networking environment and which comprise the following:

receiving at a first TS server user authentication credentials generated by a credential service prior to or with a user request for a TS session;

authenticating the user to the first TS server using the received authentication credentials;

receiving at the first TS server the user request indicating that a TS session with a TS server is to be initiated;

searching at the first TS server for any prior TS sessions previously initiated by the user with any of the one or more TS servers;

determining, based on the search, whether at least one prior TS session was initiated with a second TS server;

if a prior TS session was determined to have been initiated with a second TS server, sending redirection data to the client computer system of the user indicating that the user request is to be redirected to the second TS server to reestablish the prior TS session with the second TS server; and establishing a TS session between the client computer system and the second TS server using the received authentication credentials, such that the TS session between the client computer system of the user and the second TS server is established without creating a temporary session between the client computer system of the user and the first TS server.

2. The method of claim 1, wherein the request includes an indication that the user is authenticated and further includes identification information identifying the user's identity.

3. The method of claim 1, wherein the user authentication credentials are generated as part of a login request.

4. The method of claim 1, further comprising:
determining that, based on the search, no prior TS sessions were established with other TS servers by the user; and
establishing a TS session between the client computer system of the user and the first TS server using the user authentication credentials.

5. The method of claim 1, further comprising:
determining that, based on the search, a prior TS session was established with the first TS server by the user; and
reestablishing the prior TS session between the client computer system of the user and the first TS server using the user authentication credentials.

6. The method of claim 1, wherein the prior TS session previously initiated by the user is a disconnected session.

7. In a computer networking environment including a client computer system and a terminal services (TS) server farm, a computer-implemented method for establishing a TS session between at least one TS server of the server farm and the client computer system without creating a temporary session, the computer-implemented method being performed by acts that are executed in the networking environment and which comprise the following:
receiving at a TS server farm session broker user authentication credentials generated in response to a TS server login request, the authentication credentials having been generated by a credential service on the user's client computer system;
receiving at the TS server farm session broker a user request indicating that a TS session with a TS server in the server farm is to be initiated, the request including identification information identifying the user as the user whose authentication credentials were previously received;
searching at the TS server farm session broker for any prior TS sessions previously initiated by the user with other TS servers in the server farm using the received authentication credentials;
determining at the TS server farm session broker, based on the search, that at least one prior TS session was initiated with an identified TS server in the server farm;
sending redirection data from the TS server farm broker to the user's client computer system indicating that the user request is to be redirected to the identified TS server to reestablish the prior TS session with the identified TS server in the server farm; and
establishing a TS session with the identified TS server using the identification information included in the user request, such that the TS session between the user's client computer system and the indicated TS server is established without creating a temporary session between the user's client computer system and the TS server farm session broker.

8. The method of claim 7, wherein the TS server farm session broker redirects user requests based on current server load status, such that the load is balanced among the TS servers in the farm.

9. The method of claim 7, wherein the TS server farm session broker is configured to store session information including session IDs, user names, server names and session state information.

10. The method of claim 7, further comprising:
the TS server farm session broker determining, based on the search, that a plurality of prior TS session were initiated with a plurality of TS servers in the server farm;
the TS server farm session broker determining, based on current server load status, which of the determined plurality of TS servers is to be selected to handle the request; and
the TS server farm session broker redirecting the user request to the TS server selected to handle the request.

11. The method of claim 10, further comprising discarding at least one of the prior TS sessions after the TS session between the selected TS server and the client computer system is established.

12. A computer program product for a computer-implemented method for establishing a terminal services (TS) session between a TS server and the client without creating a temporary session, the computer program product comprising one or more physical storage media having thereon computer-executable instructions that, when executed by one or more processors of the computing system, cause the computing system to perform the method, and the method comprising:
receiving at a first TS server user authentication credentials generated by a credential service prior to or with a user request for a TS session;
authenticating the user to the first TS server using the received authentication credentials;
receiving at the first TS server the user request indicating that a TS session with a TS server is to be initiated;
searching at the first TS server for any prior TS sessions previously initiated by the user with any of the one or more TS servers;
determining, based on the search, whether at least one prior TS session was initiated with a second TS server;
if a prior TS session was determined to have been initiated with a second TS server, sending redirection data to the client computer system of the user indicating that the user request is to be redirected to the second TS server to reestablish the prior TS session with the second TS server; and
establishing a TS session between the client computer system and the second TS server using the received authentication credentials, such that the TS session between the client computer system of the user and the second TS server is established without creating a temporary session between the client computer system of the user and the first TS server.

13. A computer networking system comprising:
a client computing system at which a client login request is entered, the client computing system generating a user request to establish a TS session with at least one TS server;
a first TS server configured to receive the user request and to provide session broker service, the first TS server comprising a search module and a redirection module;
an authentication credential service configured to receive user authentication credentials, authenticate the credentials and delegate the user's authenticated credentials from the client computing system to the first TS server prior to or with the user request;
one or more additional TS servers each containing session state information indicating whether the particular user at the client computing system previously initiated any session with that TS server, so that when the search module of the first TS server searches the session state information for the one or more additional TS servers, those servers that have had prior sessions with the user are identified by the first TS server, and wherein, if the first TS server determines, based on the search, that at least one prior TS session was initiated with a second TS server the first TS server then sends from its redirection module redirection data to the user's client computing system indicating that the user request is to be redirected to the second TS server to reestablish the prior TS session with the second TS server so that the second TS server establishes a TS session with the user's client computer system using the received authentication credentials, with the TS session between the user's client computing system and the second TS server being established without creating a temporary session between the user's client computing system and the first TS server.

\* \* \* \* \*